Dec. 6, 1932.    G. E. CHATILLON    1,889,948
PROTECTIVE DEVICE FOR SCALES
Filed Feb. 17, 1928
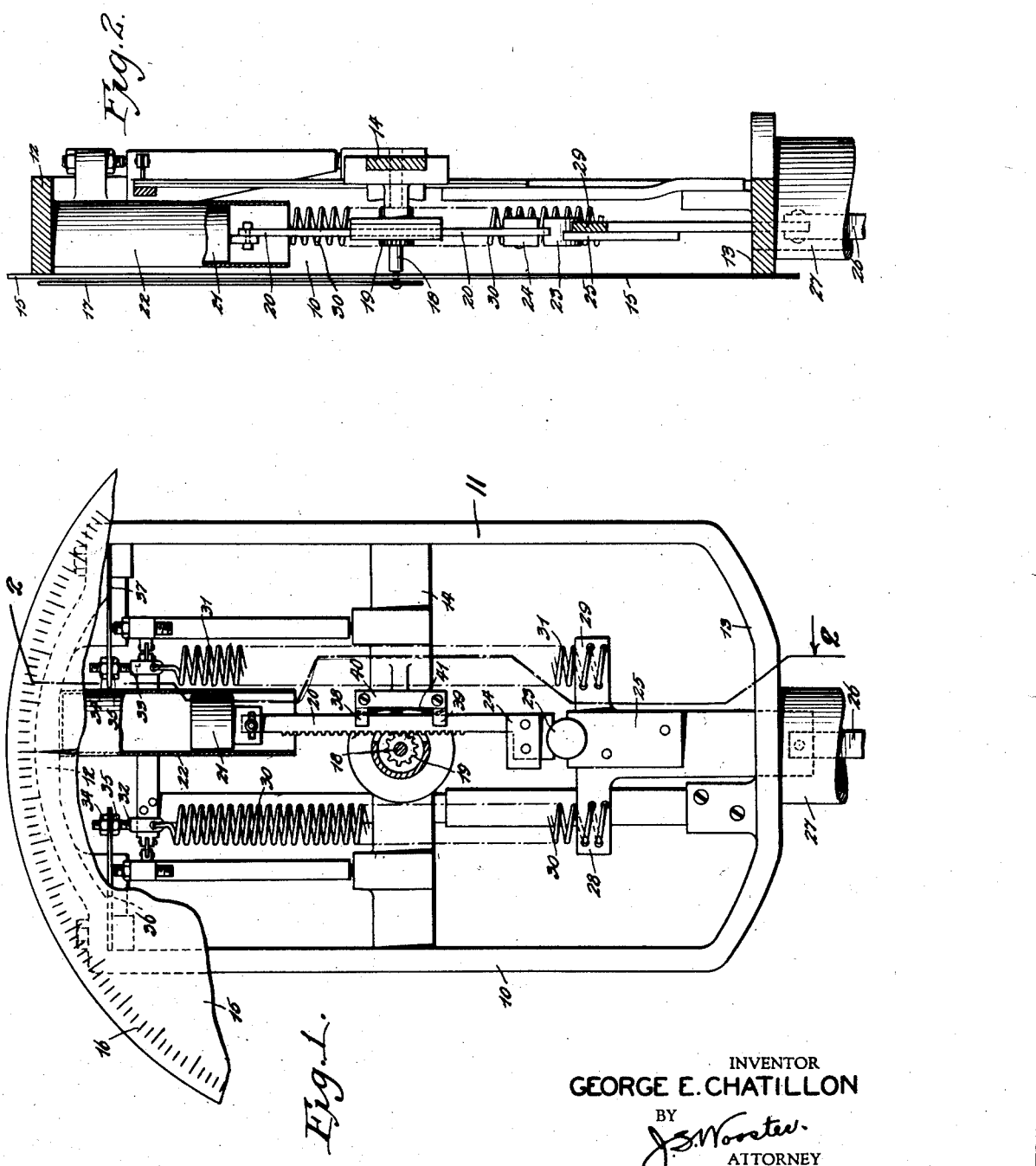
INVENTOR
GEORGE E. CHATILLON
BY
J. S. Wooster
ATTORNEY Patented Dec. 6, 1932

1,889,948

UNITED STATES PATENT OFFICE

GEORGE R. CHATILLON, OF NEW YORK, N. Y., ASSIGNOR TO JOHN CHATILLON & SONS, OF NEW YORK, N. Y., A CORPORATION OF NEW YORK

PROTECTIVE DEVICE FOR SCALES

Application filed February 17, 1928. Serial No. 255,119.

This invention relates to means for preventing damage to the indicating mechanism of scales, dynamometers, spring balances and the like, when loads are suddenly applied thereto.

In such devices, the runner has been generally directly connected to the pointer through the intermediary of a rack connected to the runner and meshing with a pinion on the pointer shaft and if a load is suddenly dumped into the scale pan, or onto the platform, the teeth on the rack and pinion often become stripped and the pointer bent.

In order to avoid this damage and in accordance with the invention, the rack is not directly connected to the runner but merely rests thereon in the no load position of the runner. The rack is provided with inertia means for retarding its downward movement so that when a load is dumped onto the platform and the runner moves suddenly downward the rack lags behind the runner and moves downward at a much slower rate so that the rack will not be affected by the spring vibrations. To more definitely control its downward movement the rack may be connected to a dashpot mechanism.

A preferred form of the invention is illustrated in the drawing of which,

Fig. 1 is a front elevation of a scale casing with the dial plate cut away, and

Fig. 2 is a vertical transverse section taken on the line 2—2 of Fig. 1.

As illustrated, the scale comprises a frame having side bars 10 and 11, top and bottom bars 12 and 13, and an intermediate cross bar 14. To the front of the frame is fastened a dial plate 15 with graduations 16 on its periphery, over which a pointer 17 swings. The pointer is mounted on a shaft 18, journalled on the cross bar 14, and provided with a pinion 19.

Engaging the pinion 19 is a rack 20, the upper end of which is pivotally connected to a damper piston 21, slidable in a cylinder 22 attached to the top bar 12 of the frame. The lower end of the rack 20 is provided with a curved seat or recess and has attached thereto, near the bottom, a weight 24. The curved seat is adapted to bear against a corresponding projecting portion 23, on the upper end of a movable runner 25. This runner is connected to a rod 26, extending down through the tubular pedestal 27 of the scale and connected either to a scale pan or to a system of levers associated with a platform not shown.

The upper end of the runner 25 is provided with oppositely extending arms 28 and 29, to which the lower ends of springs 30 and 31 are fastened. The upper ends of these springs are connected to threaded stems 32 and 33, adjusted by means of nuts 34 and 35 on the ends of flat spring supporting members 36 and 37 fastened to the scale frame or casing. These stems 32 and 33 may, on the other hand, be connected directly to the top bar 12 of the scale frame or casing.

Adjacent the pinion 19, rack 20 slides between spaced pairs of oppositely disposed arms, such as 38 and 39 on a plate 40 which is fastened to the cross bar 14. This guiding element 40 is provided with a spring 41 which bears against the rear face of the rack 20 to hold it against the pinion 19.

In the operation of the device, when a load is suddenly applied to the scale, the runner 25 moves downward suddenly. The inertia of the weight 24 and the retarding action of the dashpot mechanism will cause the rack 20 immediately to separate from the runner 25. The runner, due to the vibratory action of the load springs, will vibrate with decreasing amplitude until it finally comes to rest. The downward movement of the rack 20 is designed, through the weight 24 and the action of the dashpot mechanism, so that for any particular load springs employed in the scale the rack will not re-engage with the runner until the runner has come to rest. In this manner a sudden downward jerk of the runner does not affect the rack and the upward vibrations of the runner while it is in revibratory motion will likewise not affect the rack.

The weight 24 is disposed on the rack below the pinion 19 so that it acts somewhat like a pendulum to keep the rack in alignment to effect proper engagement between the recess or notch on the runner and the curved projection 23 on the rack.

I claim:

1. In a scale, a runner, a vertically movable gravity actuated rack resting thereon at no load, the rack and runner being freely separable on the application of load, and means on the rack controlling said rack movement.

2. In a scale, a runner, a vertically movable gravity actuated rack resting thereon at no load, the rack and runner being freely separable on the application of load and the rack being adapted to follow the runner after separation, and means on the rack controlling said rack movement.

3. In a scale, a runner, a vertically movable rack resting thereon at no load, the rack and runner being freely separable on the application of load, means moving the rack when separated from the runner, and means controlling said rack movement, the rack end and runner having cooperating means to guide and position the rack on the runner as they re-engage.

4. In a scale, a runner, a vertically movable gravity actuated rack resting thereon at no load, the rack and runner being freely separable on the application of load and the rack being adapted to follow the runner after separation, and means controlling said rack movement, the rack end and the runner having cooperating means to guide and position the rack on the runner as they reengage.

5. In a scale, a runner, a vertically movable rack resting thereon at no load, the rack and runner being freely separable on the application of load, means moving the rack downward when separated from the runner, the rack end and the runner having cooperating means to guide and position the rack on the runner as they re-engage.

6. In a scale, a runner, a vertically movable rack resting thereon at no load, the rack and runner being freely separable on the application of load, a weight on the rack below its center to move it downward when separated from the runner, the rack and runner having a cooperating notch and projection on their adjacent ends to guide and position the rack on the runner as they re-engage.

7. In a scale, a pointer, a runner, a vertically movable rack normally in contact with the runner at no load, means on the rack possessing substantial inertia to cause said rack to lag behind the runner on sudden downward movement of the runner and to move downward by gravity independent of the runner until contact is restored, and means connected to said rack to prevent re-engagement with the runner until the runner has come to rest.

8. In a scale, a pointer, an actuating pinion therefor, a vertically movable rack for actuating said pinion, a runner normally in contact with said rack at no load and means on said rack possessing substantial inertia to cause said rack to lag behind the runner on sudden downward movement of the runner and to move downwardly by gravity and independent of the runner until contact is restored and means to prevent the re-engagement of the rack with the runner until the runner has come to rest.

9. In a scale, a runner, a vertically movable rack resting thereon at no load, a pinion meshing with said rack, a weight on said rack below said pinion and means connected to the rack to retard its downward movement in a regulated manner.

10. In a scale, a runner, a vertically movable rack resting thereon at no load, a pinion meshing with said rack, a weight on said rack below said pinion, dashpot means connected to the rack to retard its downward movement, said weight and said dashpot means adapted to prevent re-engagement of the rack with the runner until the runner has come to rest under the influence of the load.

11. In a scale, a runner, a vertically movable rack resting thereon at no load, a pinion meshing with said rack, a weight on said rack below said pinion, dashpot means connected to the rack to retard its downward movement, said weight and said dashpot means adapted to prevent re-engagement of the rack with the runner until the runner has come to rest under the influence of the load, said rack and runner having a cooperating notch and projection on their adjacent ends to facilitate the positioning of the rack and runner as they re-engage.

12. In a scale, a runner, a vertically movable rack resting thereon at no load, the rack and runner being freely separable on the application of load, means for moving rack when separated from the runner, and dashpot means associated with said rack for controlling said rack movement.

13. In a scale, a runner, a pointer actuating rack cooperating with but separated from the runner, and dashpot means associated with said rack to retard the downward movement of the rack in a definite manner when the runner moves downwardly under sudden application of a load.

14. In a scale, a runner, a pointer actuating rack resting on the runner but separable therefrom when the runner moves downwardly upon the sudden application of a load, and dashpot means to prevent reengagement of the rack with the runner until the runner is at rest.

15. In a scale, a pointer, a runner, a vertically movable rack normally in contact with the runner at no load, dashpot means associated with said rack possessing substantial inertia to cause said rack to lag behind the runner on sudden downward movement of the runner, and to move downwardly by gravity independently of the runner until contact is restored.

Signed at New York city, in the county of New York, and State of New York, this 15th day of February, A. D. 1928.

GEORGE E. CHATILLON.